US012202253B2

(12) United States Patent
Li et al.

(10) Patent No.: US 12,202,253 B2
(45) Date of Patent: Jan. 21, 2025

(54) CONTINUOUS SHEET AND CUT SHEET PRINTING

(71) Applicant: Hewlett-Packard Development Company, L.P., Spring, TX (US)

(72) Inventors: Wenbing Li, Singapore (SG); Chee Loong Yap, Singapore (SG)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 185 days.

(21) Appl. No.: 18/041,100

(22) PCT Filed: Aug. 10, 2020

(86) PCT No.: PCT/US2020/045593

§ 371 (c)(1),
(2) Date: Feb. 9, 2023

(87) PCT Pub. No.: WO2022/035414

PCT Pub. Date: Feb. 17, 2022

(65) Prior Publication Data

US 2023/0286298 A1 Sep. 14, 2023

(51) Int. Cl.
*B41J 11/04* (2006.01)

(52) U.S. Cl.
CPC .................................... *B41J 11/04* (2013.01)

(58) Field of Classification Search
CPC ..... B41J 11/04; B41J 11/485; B65H 2301/12; B65H 2701/1826; B65H 2701/1842; B65H 3/0669; B65H 20/02
See application file for complete search history.

(56) References Cited

U.S. PATENT DOCUMENTS

| | | | |
|---|---|---|---|
| 5,435,537 | A | 7/1995 | Gysling |
| 6,491,462 | B1 | 12/2002 | Juan et al. |
| 2002/0001006 | A1 | 1/2002 | Matsumoto et al. |
| 2014/0071194 | A1 | 3/2014 | Inokuchi et al. |
| 2016/0216674 | A1 | 7/2016 | Numazu et al. |
| 2018/0257408 | A1 | 9/2018 | Eiyama et al. |

FOREIGN PATENT DOCUMENTS

| | | | | |
|---|---|---|---|---|
| CN | 104290469 B | 4/2017 | | |
| EP | 1029694 A1 | 8/2000 | | |
| EP | 1029695 A1 * | 8/2000 | .......... | B41J 11/0085 |
| WO | 97/22477 A1 | 6/1997 | | |

OTHER PUBLICATIONS

Juan Fernando et al., “Automatic Print Media Handling” (EP 1029695 A1), Aug. 23, 2000, [Abstract] (Year: 2000).*

* cited by examiner

*Primary Examiner* — Lisa Solomon
(74) *Attorney, Agent, or Firm* — Jordan IP Law, LLC

(57) ABSTRACT

Examples include an apparatus comprising a media path assembly for a printer. The assembly comprises a transmission module configured to be connected to a first motor of the printer and a first roller connected to the transmission module. The first roller is driven by the first motor through the transmission module when pulling a continuous sheet from a roll around a spindle of the printer in a forward direction towards a print zone of the printer. The transmission module is configured to be connected to a second roller of the printer, the second roller being driven by the first motor through the transmission module when pulling a cut sheet from a cut sheet tray of the printer in a forward direction towards the print zone.

15 Claims, 6 Drawing Sheets

CONTINUOUS SHEET AND CUT SHEET PRINTING

BACKGROUND

This disclosure generally relates to printers which permit printing either on a substrate in the form of a continuous sheet or on a substrate in the form of a cut sheet. Printing on such different substrates provides flexibility as to the types of substrates on which printing may take place.

DETAILED DESCRIPTION

Printing either on a substrate in the form of a continuous sheet or on a substrate in the form of a cut sheet may be realized in a number of different manners, for example by manually inserting either a continuous sheet or a cut sheet along a same media path. Manual manipulation of a printing substrate may however result awkward or lead to damaging the substrate, particularly in the case of large format printers using a large format printing substrate or printing media, for example ANSI (American National Standards Institute) A (229 mm×305 mm), B (305 mm×457 mm), C (457 mm×610 mm), D (610 mm×914 mm) or E (914 mm×1219 mm) cut sheets formats, or continuous sheet rolls such as, for example, 90-meter-long E size paper which may weigh up to 8 kg. The subject of the present disclosure relates to providing such a printing capability in an automated manner, reducing or suppressing manual intervention, and doing so while limiting or reducing a number and cost of mechanical elements providing such automated capability. The subject of the present disclosure also permits reusing existing mechanical elements while gaining capabilities. The subject of the present disclosure indeed also offers the possibility to upgrade a printer lacking such capability in order to gain the capability to switch from printing on a substrate in the form of a continuous sheet or on a substrate in the form of a cut sheet and back in an automated manner.

A continuous sheet should be in this disclosure understood as a flexible and planar printing media provided rolled in a roll in order to be placed on a printer spindle. A continuous sheet may have a width along a direction parallel to a longitudinal axis of the roll, and a length along a direction perpendicular to the width. In some examples, the length of the continuous sheet is at least 20 times longer than the width of the continuous sheet when the roll of continuous sheet is provided. In some examples, the length is at least 40 times longer than the width when the roll of continuous sheet is provided. In some examples, the length is at least 60 times longer than the width when the roll of continuous sheet is provided. A continuous sheet may be cut by a printer cutter downstream from a print zone when a corresponding print job has been completed.

A cut sheet should be in this disclosure understood as a flexible and planar printing media provided in a sheet form, in some examples in the form of a stack of cut sheet, in order to be placed on a printer cut sheet tray for picking up such cut sheet one by one for printing. A cut sheet may have a width along a direction perpendicular to a media path direction, and a length along a direction perpendicular to the width. In some examples, the length of each cut sheet is of less than thrice the width of the cut sheet. In some examples, the length is of less than twice the width.

Figure 1:
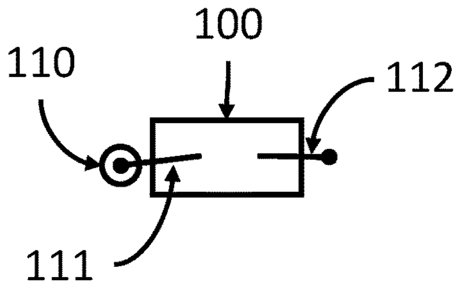
FIG. 1 illustrates an example apparatus.

FIG. 1 illustrates an example apparatus comprising a media path assembly for a printer, the assembly comprising a transmission module 100 and a first roller 110. The assembly comprising the transmission module 100 and the first roller 110 may be provided separately from an existing printer as an assembly which may be integrated into such an existing printer. In some examples, the printer is one of a thermal inkjet printer or a piezo inkjet printer. In some examples, the printer is a large format printer. In some examples, a large format printer comprises a print zone spanning at least 290 mm. In some examples, a large format printer comprises a print zone spanning at least 450 mm. In some examples, a large format printer comprises a print zone spanning at least 900 mm. In some examples, the printer comprises a printhead carriage reciprocating along a print zone span of the printer in order to print.

The assembly comprising the transmission module 100 and the first roller 110 is comprised in a media path assembly for a printer. A media path should be understood as a trajectory or path followed by a printing media or printing substrate, such as a continuous or cut sheet, being displaced from a storage location such as, for example, a media roll or a media tray, towards a print zone of the printer. A media path may be defined by a number of media handling elements such as trays, spindles, guiding structures or platen, vacuum pumps or vacuum platen, or rollers including for example pinch rollers, tire rollers or freewheeling rollers. In some examples the first or second rollers according to this disclosure comprise sets of picking tires. In some examples the first or second rollers according to this disclosure are supported or pressed on the corresponding sheet by one or more springs.

Figure 2A:
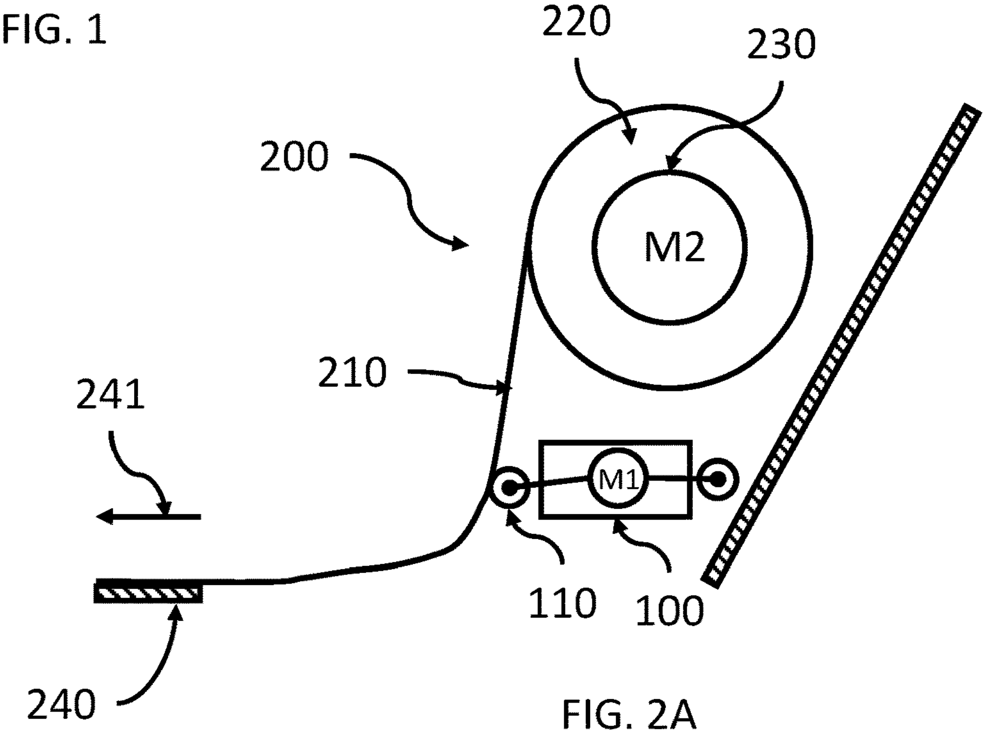
FIG. 2A-D illustrate another example apparatus.
Figure 2B:
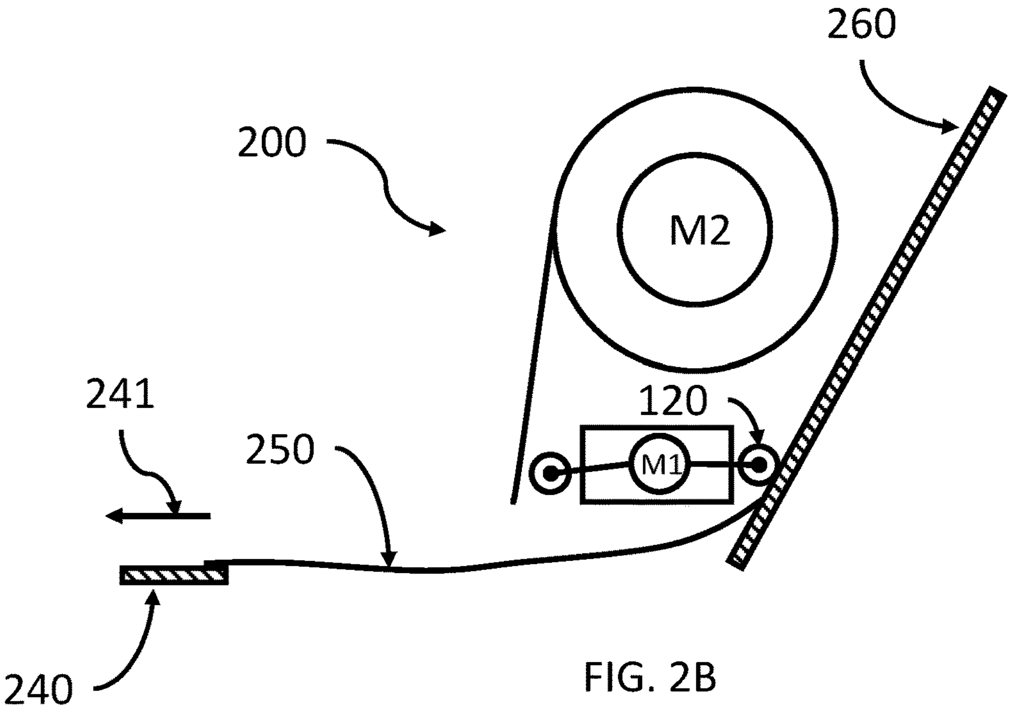

A transmission module such as transmission module 100 should be understood in this disclosure as a mechanical transmission module, the transmission module providing transmission of a mechanical force from a motor to a roller such as the first roller. The transmission module may comprise a clutch permitting switching from a mechanical configuration to another mechanical configuration. The transmission module such as transmission module 100 is configured to be connected to a first motor of the printer. In FIGS. 2A and 2B, the transmission module 100 and the first roller 110 are illustrated as integrated in an example printer 200 comprising a first motor M1 of the printer 200, the transmission module 100 being configured to be connected to the first motor M1 of the printer.

When same or similar elements are appearing on several Figures, a same reference numeral may be used for such same or similar elements. In some Figures, not all elements are numbered in order to maintain readability of the Figures.

In this disclosure, the mechanical connection between mechanical elements such as the transmission module, motors or rollers or the transmission of mechanical force within the transmission module may for example take place using one or more gears, one or more belts, one or more pulleys, one or more chains, one or more cables, one or more cams, one or more crank, one or more shaft, one or more clutch, one or more lever, one or more swing arms, one or more mechanical switches, or a combination of these.

As illustrated in FIG. 1, the first roller 110 is connected to the transmission module 100, for example through a first mechanical connection 111 of the transmission module 100. As illustrated in FIG. 2, when integrated in a printer such as printer 200, the first roller 110 is driven by the first motor M1 through the transmission module 100 when pulling a continuous sheet 210 from a roll 220 around a spindle 230 of the printer 200 in a forward direction such as direction 241 towards a print zone 240 of the printer 200. The first motor may be an electrical motor. In some examples the first motor is a servo controlled DC (direct current) motor. When pulling the continuous sheet 210 from the roll 220 the first roller 110 exerts a friction force on the continuous sheet resulting in displacing the sheet towards the print zone 240, the friction force being mechanically transmitted to the first roller by the first motor M1 through the transmission module 100. In some examples, the speed of displacement of the continuous sheet is in a range between 2.5 cm per second and 50 cm per second.

As illustrated for example in FIG. 2B, the transmission module such as example transmission module 100 is configured to be connected to a second roller 120 of the printer such as example printer 200, the second roller 120 being driven by the first motor such as example motor M1 through the transmission module 100 when pulling a cut sheet such as example cut sheet 250 from a cut sheet tray such as cut sheet tray 260 of the printer 200 in a forward direction such as direction 241 towards the print zone 240. Connection between the transmission module and the second roller may take place using a second mechanical connection 112 of the transmission module 100.

In some examples, the first and second connections comprise gears and belts.

The transmission module such as example transmission module 100 is configured to be connected to the first motor, to the first roller, and to the second roller, both the first and second rollers being driven by the first motor through the transmission module in order to pull either a cut sheet using the second roller or a continuous sheet using the first roller. This configuration permits using a same single first motor to drive both the first and the second roller, the transmission module permitting transmitting the force produced by the first motor to either the first or the second roller, thereby avoiding using two motors instead of one. In some examples, the first motor operates in a single direction corresponding to the forward direction towards the print zone. In some examples, the first motor pertains to a preexistent printer upgraded with the transmission module and with the first roller, the first motor of the preexistent printer being used in the preexistent printer to drive the second roller in order to feed cut sheets towards the print zone, thereby leveraging a preexistent motor such as the first motor to drive the first roller in order to direct the continuous sheet towards the print zone.

In some examples, the transmission module such as transmission module 100 is configured to position the first roller either in a first roller engaged position as illustrated for example in FIG. 2A, or in a first roller release position as illustrated for example in FIG. 2B, wherein the first roller 110 is decoupled from the continuous sheet in the release position of FIG. 2B. In some examples, the transmission module such as transmission module 100 is configured to position the second roller either in a second roller engaged position as illustrated for example in FIG. 2B or in a second roller release position wherein the second roller is decoupled from the cut sheet in the release position as illustrated for example in FIG. 2A. An engaged position of a roller should be understood as a position of a roller in contact with the corresponding sheet. A release position of a roller should be understood as a position in which the roller is away from the corresponding sheet. A release position may correspond to a so-called parking position. Maintaining a roller in a release position avoids applying a pressure on a corresponding sheet when such corresponding sheet is not being driven, thereby avoiding introducing tension in the media path or avoiding marking the sheet at a point of contact between the sheet and a roller.

In some examples, a peripheral contact surface of the second roller is, when the second roller is in a release position, separated from a surface of the cut sheet tray on which cut sheets are stacked by a distance of up to 3 mm. In some examples, a peripheral contact surface of the second roller is, when the second roller is in a release position, separated from a surface of the cut sheet tray on which cut sheets are stacked by a distance of up to 2.5 mm. In some examples, a peripheral contact surface of the second roller is, when the second roller is in a release position, separated from a surface of the cut sheet tray on which cut sheets are stacked by a distance of more than 2 mm.

Figure 2C:
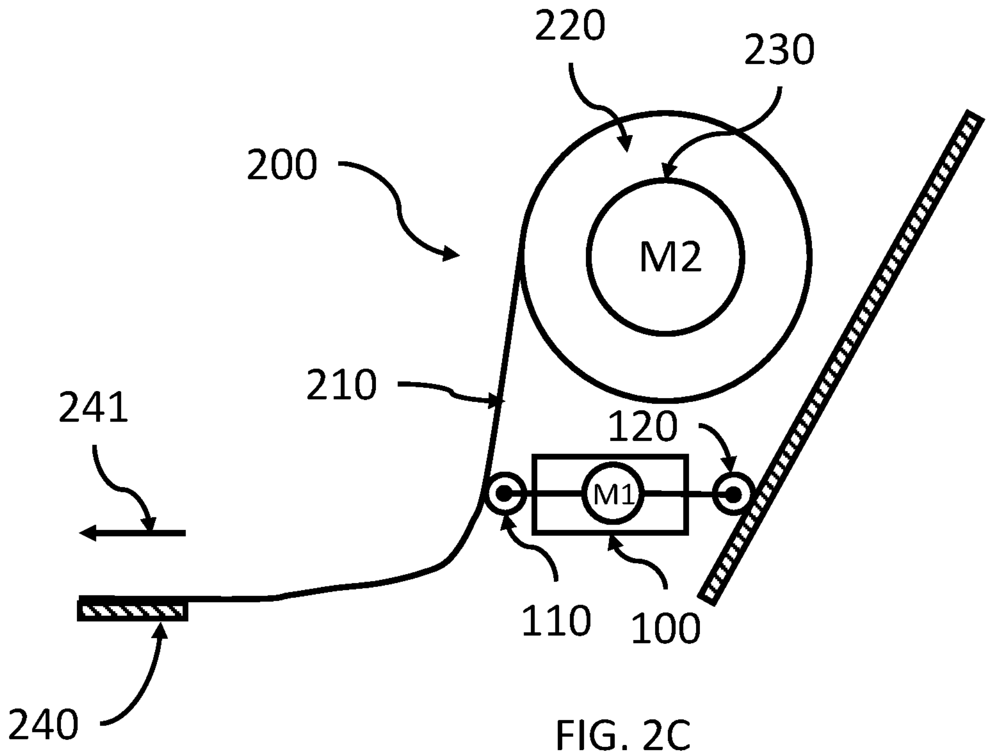

In some examples, the transmission module comprises a mechanical configuration such that both the first and the second rollers are simultaneously engaged as illustrated for example in FIG. 2C. Such a configuration may for example permits advancing both a cut sheet and the continuous sheet simultaneously towards the print zone, for example to permit preparing printing on a cut sheet while a print job on the continuous sheet is being completed, such a configuration preceding for example the configuration illustrated in FIG. 2B.

Figure 2D:
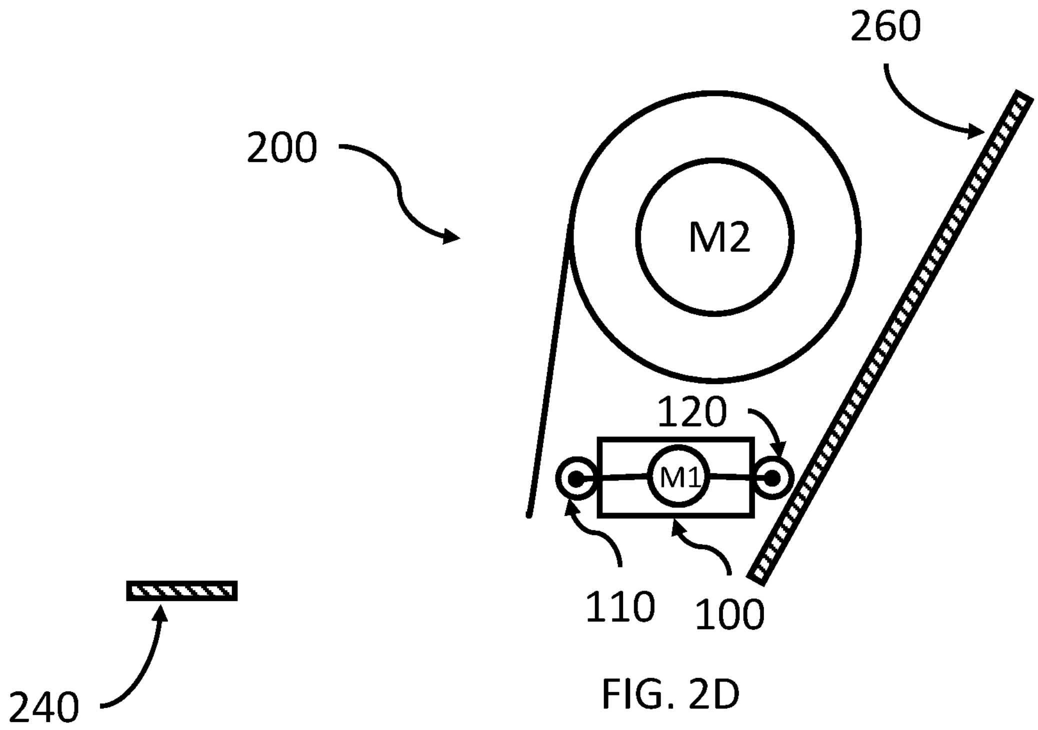

In some examples, the transmission module comprises a mechanical configuration such that both the first and the second rollers are simultaneously in a released position as illustrated form example in FIG. 2D. Such a configuration may for example permit loading the printer with both cut sheets and a roll of continuous sheet.

In some examples, the transmission module is configured to be selectively operated either in a first roller driving configuration as illustrated for example in FIG. 2A or in a second roller driving configuration as illustrated for example in FIG. 2B. In some examples, the transmission module is in a first position in the first roller driving configuration, and in a second position in the second roller driving configuration, the first position differing from the second position. In some examples, the transmission module comprises an actuator such as, for example, a lever, whereby the actuator is in a first state in the first roller driving configuration and in a second state in the second roller driving configuration. In such examples, the transmission module prevents driving both a cut sheet and a continuous sheet simultaneously. An actuator of the transmission module may in some examples be mechanically linked to a clutch of the transmission module. The transmission module may in some examples change position by translation, by rotation, or by a combination of translation and rotation.

Figure 3:
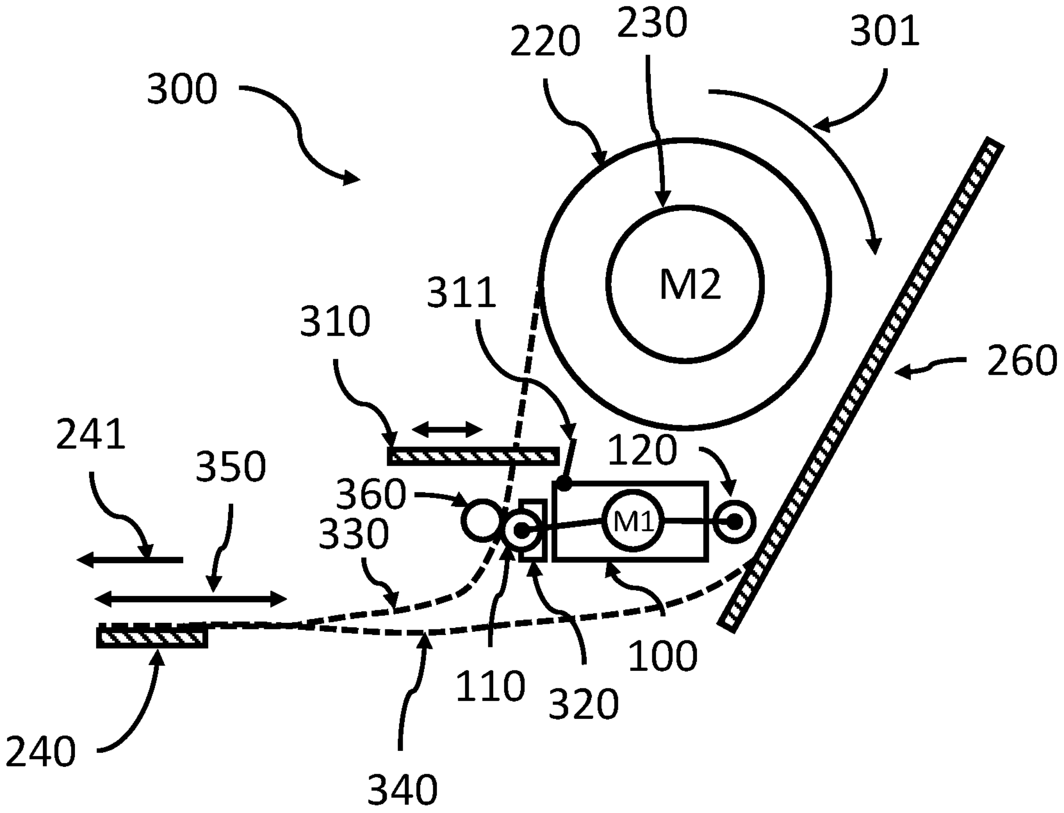
FIG. 3 illustrates a further example apparatus.

In some examples as illustrated for example in a printer 300 of FIG. 3, a transmission module 100 as per this disclosure is configured to interact with a reciprocating element 310 of the printer 300 in order to place the transmission module either in the first roller driving configuration or in the second roller driving configuration. In some examples, the reciprocating element interacts with an actuator or lever 311 of the transmission module 100. In some examples, the reciprocating element reciprocates in a direction parallel to the forward direction. In some examples, the reciprocating element reciprocates in a direction parallel to an axis of the spindle 230. In some examples, the reciprocating element is a printhead carriage. In some examples, the reciprocating element is a service station shuttle, the service station shuttle permitting cleaning and maintenance of one or more printheads. In such examples, appropriate placement of the transmission module is obtained by leveraging an element which already serves a different purpose in the printer (such as transporting the printhead, or servicing the printhead for example), thereby further reducing the number of elements permitting the automation of printing either from a cut sheet or from a continuous sheet. The reciprocating element may for example interact with the transmission module in function of reaching respective end positions when reciprocating, while maintaining other functions of the reciprocating element.

Figure 4:
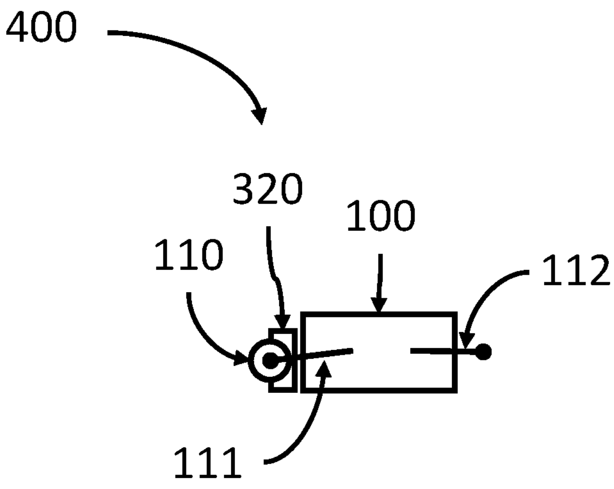
FIG. 4 illustrates a first example printing method.

In some examples as illustrated for example in the printer 300 of FIG. 3, or in the corresponding media path assembly 400 of FIG. 4, the media path assembly further comprises a case 320 for encasing the first roller. Such a case may protect the first roller from being damaged and may be particularly appropriate when the first roller and transmission modules are provided separately from a printer in order to get integrated into a pre-existing printer, for example in order to upgrade such pre-existing printer. The case may in some examples cover the first roller partially, whereby elements such as pinch wheels or tires of the first roller extend outside of the case.

In some examples as illustrated for example in FIG. 3, an apparatus according to this disclosure such as printer 300 comprises the transmission module 100, the first roller 210, the first motor M1, the spindle 230, the cut sheet tray 260, a reciprocating element 310, a platen 240 forming the print zone, and a second motor M2 for driving the spindle 230 in a backward direction, the backward direction 301 pulling the continuous sheet from the roll 220 around the spindle 230 in a direction away from the print zone 240. In some examples the second motor is a servo controlled DC (direct current) motor.

The second motor according to this disclosure permits rewinding the continuous sheet onto the roll, thereby permitting passage of cut sheets towards the print zone. The continuous sheet may be partially rewound as illustrated for example in FIG. 2B in order to free up passage of a cut sheet towards the print zone.

In some examples as illustrated for example in FIG. 3, an apparatus according to this disclosure such as printer 300 comprises a first media path 330 and a second media path 340, the first media path 330 corresponding to a path followed by the continuous sheet 210, the first media path 330 leading the continuous sheet from the roll 220, by the first roller 110 and to the print zone 240, the first roller 110 being positioned along the first media path between the roll 220 and the print zone 240 at a point where the continuous sheet 210 is unrolled from the roll 220, the second media path 340 corresponding to a path followed by the cut sheet 250, the second media path 340 leading the cut sheet 250 from the cut sheet tray 260, by the second roller 120 and to the print zone 240, the first 330 and the second 340 media paths sharing a common media path 350 downstream from both the first 110 and the second 120 rollers. Sharing a common media path permits sharing a same print zone, thereby avoiding usage of different print zones in a same printer. Positioning the first roller 110 along the first media path between the roll 220 and the print zone 240 at a point where the continuous sheet 210 is unrolled from the roll 220 permits an increased control on the driving of the sheet, in particular compared to an alternative first roller position at a point which would be in contact with the roll itself. In some examples, as illustrated for example on FIG. 3, the apparatus such as example printer 300 further comprises a freewheeling roller 360 facing the first roller 110, and the cut sheet tray 260 faces the second roller 120. Such a configuration permits sandwiching the continuous sheet directly between the first roller and the freewheeling roller 360, both the first roller and the freewheeling rollers being for example positioned along the first media path between the roll 220 and the print zone 240 at a point where the continuous sheet 210 is unrolled from the roll, thereby permitting a direct control of the driving of the continuous sheet. In some examples, a peripheral contact surface of the first roller is, when the first roller is in a release position, separated from a peripheral contact surface of the freewheeling roller by a distance of up to 10 mm. In some examples, a peripheral contact surface of the first roller is, when the first roller is in a release position, separated from a peripheral contact surface of the freewheeling roller by a distance of up to 8 mm. In some examples, a peripheral contact surface of the first roller is, when the first roller is in a release position, separated from a peripheral contact surface of the freewheeling roller by a distance of at least 5 mm.

Figure 5:
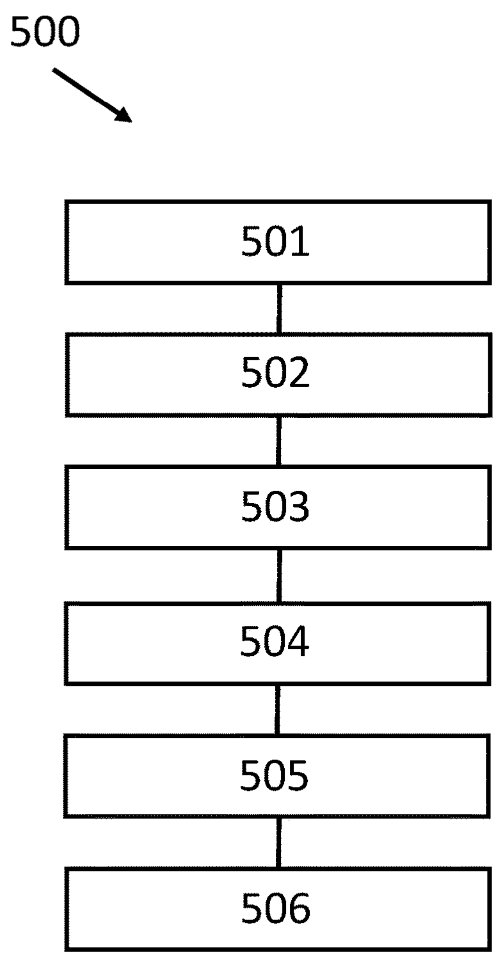
FIG. 5 illustrates a second example printing method.

FIG. 5 illustrates an example printing method 500 which may in some examples be used with an assembly according to this disclosure. The method comprises, in bloc 501, receiving, at a printer controller, a first print job for printing on a continuous sheet from a roll around a spindle of a printer. A print job should be understood as comprising data related to an image to print, and data related to a type of sheet to use to print the image. Such data related to a type of sheet to use to print the image permits identifying, by the printer controller, if the image should be printed on a cut sheet or on a continuous sheet. In block 501, the first print job is identified as a print job destined to being printed on a continuous sheet.

An example printer controller comprises a processor, a memory and a networking module, the processor being configured to operate according to any of the methods hereby described. A processor may comprise electronic circuits for computation managed by an operating system. A processor my perform as per any of the method described based on a non-transitory machine-readable or computer readable storage medium, such as, for example, a memory or storage unit of the printer, whereby the non-transitory machine-readable storage medium is encoded with instructions executable by the processor such as the processor of the printer controller, the machine-readable storage medium comprising instructions to operate the processor to perform as per any of the example methods hereby described. A computer readable storage may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described. Storage or memory may include any electronic, magnetic, optical or other physical storage device that stores executable instructions as described hereby.

Printing method 500 further comprises, in block 502, printing the first print job at a print zone of the printer, the continuous sheet being pulled towards the print zone by a first roller connected to a transmission module, the transmission module being connected to a first motor, for example motor M1, the first roller being in a first roller engaged position while pulling the continuous sheet towards the print zone. This permits obtaining the first print job on the continuous sheet, the continuous sheet being submitted to friction applied by the first roller, a traction force being applied by the first roller onto the continuous sheet, the traction force being generated by the first motor and transmitted to the first roller by the transmission module. During block 502, a printer may be in a configuration as illustrated for example in FIG. 2A.

Printing method 500 further comprises, in block 503, receiving, at the printer controller, a second print job for printing on a cut sheet from a cut sheet tray of the printer. In some examples, the second print job directly follows the first print job. In such cases, a printer should switch from printing on the continuous sheet to printing on a cut sheet.

Printing method 500 further comprises, in block 504, pulling the continuous sheet in a backward direction, such as for example direction 301 of FIG. 3, away from the print zone using a second motor, for example motor M2, the spindle being driven in the backward direction by the second motor. This permits freeing up the print zone from the continuous sheet, preparing passage of a cut sheet.

Printing method 500 further comprises, in block 505, pulling, by a second roller such as, for example, second roller 120, the cut sheet from the cut sheet tray in a forward direction towards the print zone, the second roller being connected to the transmission module, the second roller being in a second roller engaged position while pulling the cut sheet towards the print zone. This permits displacing the cut sheet from the cut sheet tray to the print zone by friction applied by the second roller onto the cut sheet, the second roller applying a traction force generated by the first motor and transmitted from the first motor to the second roller by the transmission module.

Printing method 500 further comprises, in block 506, printing the second print job at the print zone, permitting obtaining a print out of the second print job onto the cut sheet.

As described for method 500, the transmission module according to this disclosure permits transmitting a force generated by the first motor to either the first roller, or to the second roller, using a same first motor, which may preexist an installation of the transmission module and first roller.

Figure 6:
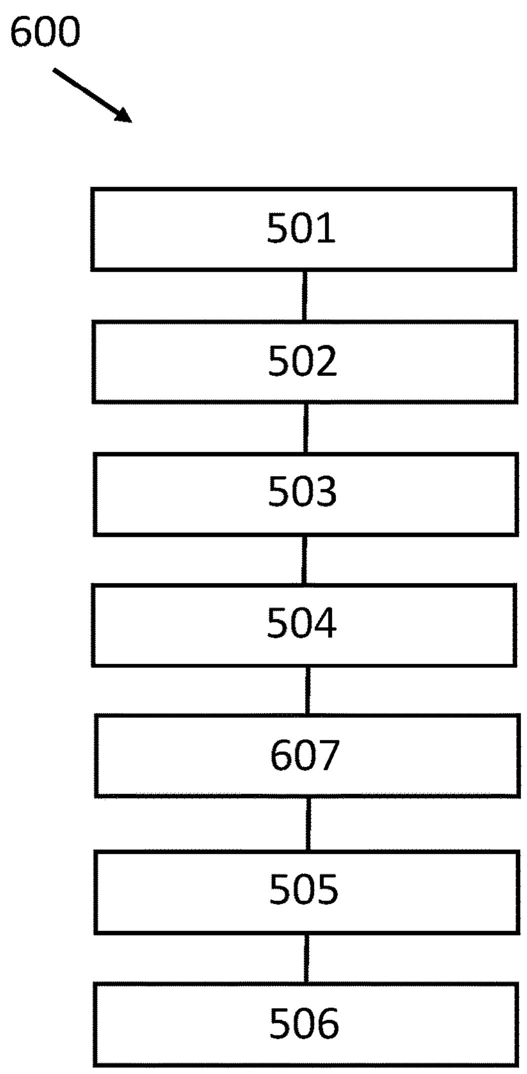
FIG. 6 illustrates a third example printing method.

FIG. 6 illustrates an example printing method 600. Method 600 comprises block 501-506 corresponding to blocks 501-506 as described for example method 500. Method 600 further comprises block 607 of placing, using the transmission module, the first roller in a first roller release position when the continuous sheet is away from the print zone, as illustrated for example in FIG. 2B. Such a release position of the first roller permits disengaging the continuous sheet from the first roller, the continuous sheet being parked while the printer proceeds with the printing on the cut sheet. Such placing of the first roller in a first roller release position according to block 607 may take place prior to proceeding with block 504 of pulling the continuous sheet in a backward direction.

Figure 7:
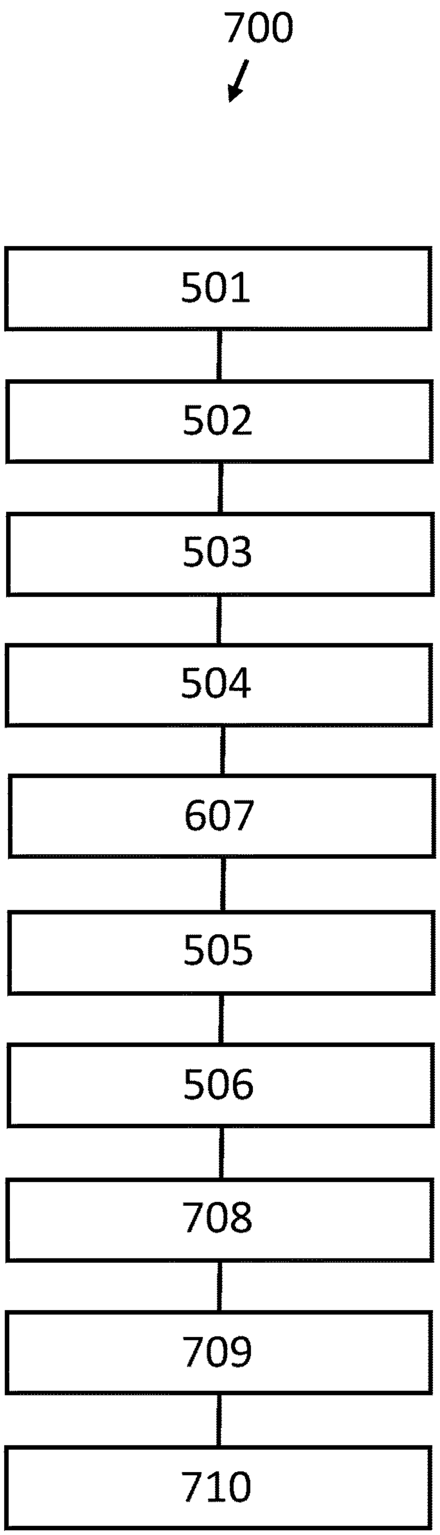
FIG. 7 illustrates a fourth example printing method.

FIG. 7 illustrates an example printing method 700. Method 700 comprises blocks 501-506 corresponding to blocks 501-506 as described for example method 500. Method 700 further comprises block 607 as described for example method 600. Method 700 further comprises block 708 of receiving, at the printer controller, a third print job for printing on the continuous sheet, the first roller being in the first roller release position. Method 700 thereby illustrates switching from printing the first print job on a continuous sheet to printing the second print job on a cut sheet, and back to printing the third print job on the continuous sheet. In some examples, other print jobs may be printed between the first and second print jobs, or between the second and third print jobs. In some examples, the third print job directly follows the second print job. According to block 708, the first roller is in the first roller release position, implying that the printer is not in a configuration of printing on the continuous sheet, and may be in a configuration of printing on a cut sheet.

Method 700 further comprises, in block 709, placing, using the transmission module, the first roller in the first roller engaged position. Such placement using the transmission module according to this disclosure enables printing the third print job on the continuous sheet. Indeed, method 700 further comprises, in block 710, printing the third print job at the print zone, the continuous sheet being pulled towards the print zone by the first roller in the first roller engaged position, the first roller pulling the continuous sheet by friction, the friction being generated by a traction force originating from the first motor and transmitted to the first roller by the transmission module.

Figure 8:
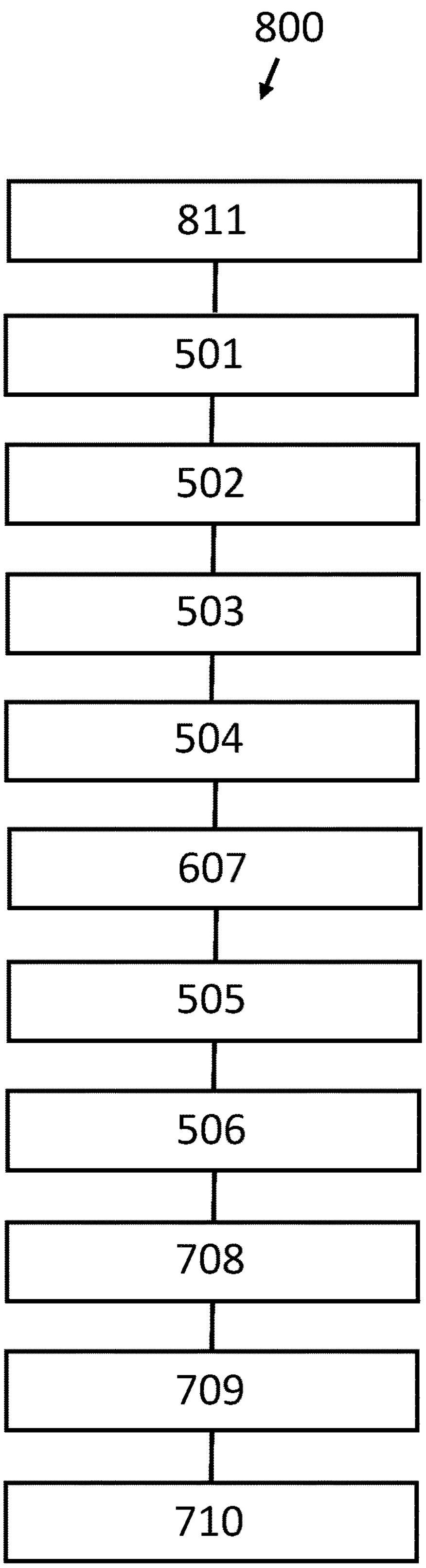
FIG. 8 illustrates a fifth example printing method.

FIG. 8 illustrates an example printing method 800. Method 800 comprises blocks 501-506 corresponding to blocks 501-506 as described for example method 500. Method 800 further comprises block 607 as described for example method 600. Method 800 further comprises blocks 708-710 as described for example method 700. Method 800 further comprises block 811 of placing the second roller in a second roller release position when the first roller is in the first roller engaged position. Such placing of the second roller in a second roller release position may take place at different times, for example during printing of the first print job and during printing of the third print job. Placing of the second roller in a second roller release position may be avoided or prevented while printing the second print job in order to maintain friction between the second roller and the cut sheet as printing takes place on the cut sheet.

Figure 9:
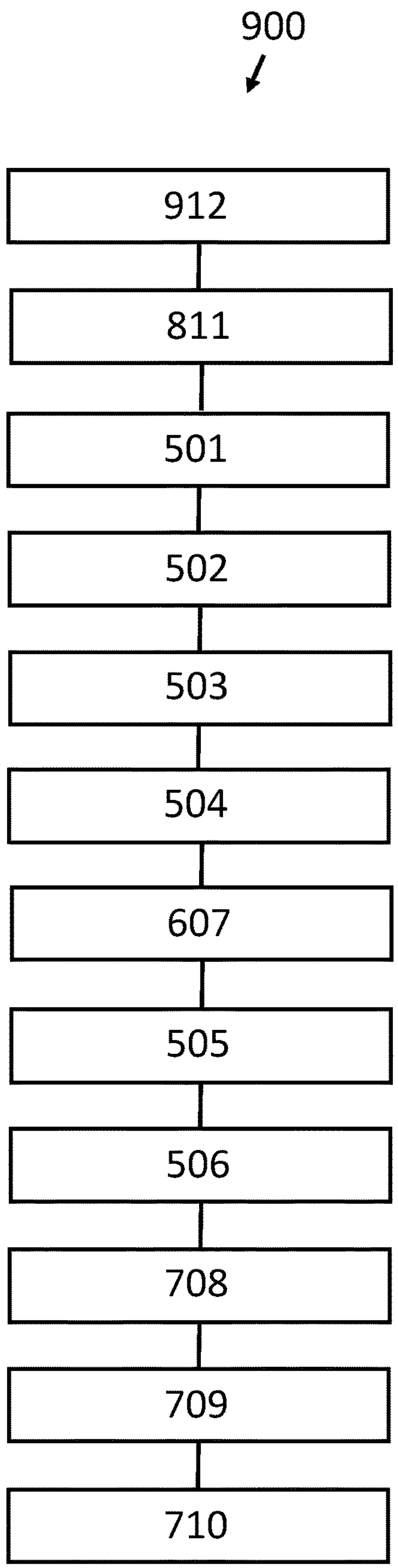
FIG. 9 illustrates a sixth example printing method.

FIG. 9 illustrates an example printing method 900. Method 900 comprises blocks 501-506 corresponding to blocks 501-506 as described for example method 500. Method 900 further comprises block 607 as described for example method 600. Method 900 further comprises blocks 708-710 as described for example method 700. Method 900 further comprises block 811 as described for example method 800. Method 900 further comprises, in block 912, the transmission module interacting with a reciprocating element such as, for example, reciprocating element 310 of the printer, in order to position the first or second rollers. Such interaction may take place at different times, for example when the transmission module switches from an engaged position of a roller to a release position of the same roller, or for example when the transmission module switches from driving the first roller to driving the second roller, or for example when the transmission module switches from driving the second roller to driving the first roller.

Figure 10:
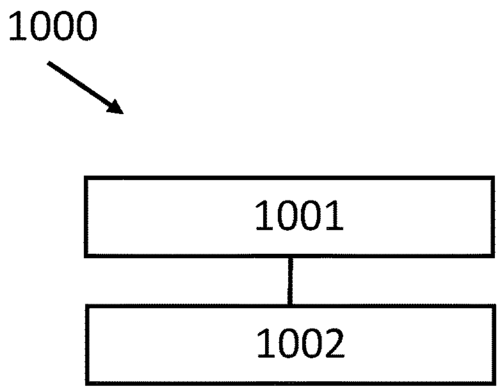
FIG. 10 illustrates an example method of upgrading a printer.

FIG. 10 illustrates an example method 1000 of upgrading a printer to operate with a media path assembly according to this disclosure, the printer comprising a first motor for pulling a cut sheet from a cut sheet tray of the printer towards a print zone of the printer and a second motor for driving a spindle of the printer. The upgrading should be understood as a modification of a pre-existing printer so such a pre-existing printer comprises the capability to automatically switch from roll to cut sheet and back, and do so while limiting or reducing a number of element added to the pre-existing printer in order to gain such capability. Method 1000 comprises a block 1001 of inserting a first roller and a transmission module in the printer, the first roller being in a case for encasing the first roller. The first roller is provided in a case in order to protect such first roller which is provided as a separate upgrading element in this case. In some examples, the first roller is inserted in a guide element on the printer. Method 1000 further comprises block 1002 of connecting the transmission module to the first motor of the printer. In this manner, the first motor, which was in the pre-existing printer driving the cut sheets, may gain an additional function which is the driving of the first roller, thereby permitting gaining an additional capability while recycling an existing first motor. In some examples, the transmission module is also connected to a second roller, such second roller being present in the pre-existing printer, the second roller being driven by the first motor for pulling the cut sheet from the cut sheet tray according to this disclosure. In some examples, the transmission module is fixed on a wall of the printer. Method 1000 may for example precede any of the printing methods hereby described.

Figure 11:
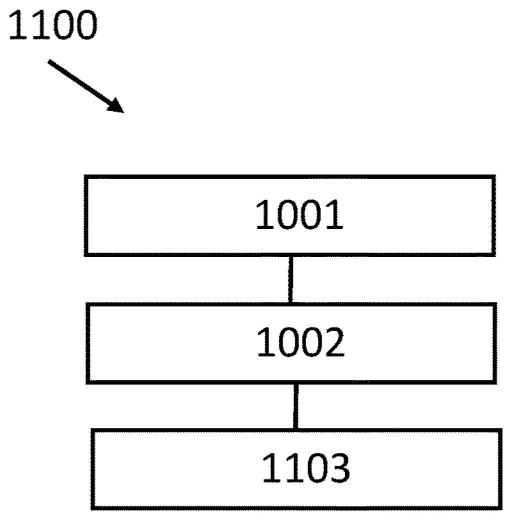
FIG. 11 illustrates another example method of upgrading a printer.

FIG. 11 illustrates another example method 1100 of upgrading a printer. Method 1100 comprises blocks 1002 and 1003 as described for method 1000. Method 1100 applies to a printer comprising a graphic display, method 1100 further comprising block 1103 of displaying instructions for the inserting of the first roller and the connecting of the transmission volume on the display, thereby easing the task of upgrading the printer while leveraging the presence of such a graphic display.

What is claimed is:

1. An apparatus comprising a media path assembly for a printer, the assembly comprising:

- a transmission module configured to be connected to a first motor of the printer; and
- a first roller connected to the transmission module, the first roller being driven by the first motor through the transmission module when pulling a continuous sheet from a roll around a spindle of the printer in a forward direction towards a print zone of the printer;
- whereby the transmission module is configured to be connected to a second roller of the printer, the second roller being driven by the first motor through the transmission module when pulling a cut sheet from a cut sheet tray of the printer in a forward direction towards the print zone.

2. The apparatus according to claim 1, whereby the transmission module is configured to:

- position the first roller either in a first roller engaged position or in a first roller release position wherein the first roller is decoupled from the continuous sheet in the release position; and
- position the second roller either in a second roller engaged position or in a second roller release position wherein the second roller is decoupled from the cut sheet in the release position.

3. The apparatus according to claim 1, whereby the transmission module is configured to be selectively operated either in a first roller driving configuration or in a second roller driving configuration.

4. The apparatus according to claim 3, the transmission module being configured to interact with a reciprocating element of the printer in order to place the transmission module either in the first roller driving configuration or in the second roller driving configuration.

5. The apparatus according to claim 1, whereby the media path assembly further comprises a case for encasing the first roller.

6. The apparatus according to claim 1, the apparatus further comprising the first motor, the spindle, the cut sheet tray, a reciprocating element, a platen forming the print zone, and a second motor for driving the spindle in a backward direction, the backward direction pulling the continuous sheet from the roll around the spindle in a direction away from the print zone.

7. The apparatus according to claim 6, whereby the apparatus comprises a first media path and a second media path, the first media path corresponding to a path followed by the continuous sheet, the first media path leading the continuous sheet from the roll, by the first roller and to the print zone, the first roller being positioned along the first media path between the roll and the print zone at a point where the continuous sheet is unrolled from the roll, the second media path corresponding to a path followed by the cut sheet, the second media path leading the cut sheet from the cut sheet tray, by the second roller and to the print zone, the first and the second media path sharing a common media path downstream from both the first and the second rollers.

8. The apparatus according to claim 7, whereby the apparatus further comprises a freewheeling roller facing the first roller, and whereby the cut sheet tray faces the second roller.

9. A printing method, the method comprising:

- receiving, at a printer controller, a first print job for printing on a continuous sheet from a roll around a spindle of a printer;
- printing the first print job at a print zone of the printer, the continuous sheet being pulled towards the print zone by a first roller connected to a transmission module, the transmission module being connected to a first motor, the first roller being in a first roller engaged position while pulling the continuous sheet towards the print zone;
- receiving, at the printer controller, a second print job for printing on a cut sheet from a cut sheet tray of the printer;
- pulling the continuous sheet in a backward direction away from the print zone using a second motor, the spindle being driven in the backward direction by the second motor;
- pulling, by a second roller, the cut sheet from the cut sheet tray in a forward direction towards the print zone, the second roller being connected to the transmission module, the second roller being in a second roller engaged position while pulling the cut sheet towards the print zone; and
- printing the second print job at the print zone.

10. The printing method according to claim 9, the method further comprising:

- placing, using the transmission module, the first roller in a first roller release position when the continuous sheet is away from the print zone.

11. The printing method according to claim 10, the method further comprising:

- receiving, at the printer controller, a third print job for printing on the continuous sheet, the first roller being in the first roller release position;
- placing, using the transmission module, the first roller in the first roller engaged position; and printing the third print job at the print zone, the continuous sheet being pulled towards the print zone by the first roller in the first roller engaged position.

12. The printing method according to claim 9, the method further comprising:

placing the second roller in a second roller release position when the first roller is in the first roller engaged position.

13. The printing method according to claim 9, the method further comprising the transmission module interacting with a reciprocating element of the printer in order to position the first or second rollers.

14. A method of upgrading a printer to operate with a media path assembly according to claim 5, the printer comprising a first motor for pulling a cut sheet from a cut sheet tray of the printer towards a print zone of the printer and a second motor for driving a spindle of the printer, the method comprising:

inserting a first roller and a transmission module in the printer, the first roller being in a case for encasing the first roller; and connecting the transmission module to the first motor of the printer.

15. A method of upgrading a printer according to claim 14, the printer comprising a graphic display, the method further comprising:

displaying instructions for the inserting of the first roller and the connecting of the transmission volume on the display.

* * * * *